United States Patent [19]

Terao

[11] Patent Number: 5,172,972
[45] Date of Patent: Dec. 22, 1992

[54] MOTOR VEHICLE HEADLAMP

[75] Inventor: Hidetoshi Terao, Shizuoka, Japan

[73] Assignee: Koito Manufacturing Co., Ltd., Tokyo, Japan

[21] Appl. No.: 745,306

[22] Filed: Aug. 15, 1991

[30] Foreign Application Priority Data

Aug. 17, 1990 [JP] Japan .................................. 2-215722

[51] Int. Cl.$^5$ ............................................. B60Q 1/06
[52] U.S. Cl. ....................................... 362/66; 362/61;
362/293; 362/304; 362/310; 362/346
[58] Field of Search ...................... 362/61, 66, 80, 277,
362/281, 282, 283, 284, 285, 287, 289, 297, 304,
310, 346, 419, 421, 428, 293

[56] References Cited

U.S. PATENT DOCUMENTS

| | | | |
|---|---|---|---|
| 4,569,007 | 2/1986 | Dick | 362/310 X |
| 4,635,170 | 1/1987 | Beiswenger | 362/304 X |
| 4,825,344 | 4/1989 | Ichihara et al. | 362/346 X |
| 5,047,903 | 9/1991 | Choji | 362/346 X |

Primary Examiner—Stephen F. Husar
Attorney, Agent, or Firm—Sughrue, Mion, Zinn Macpeak & Seas

[57] ABSTRACT

A motor vehicle headlamp having an improved mounting structure of an extension reflector provided between the front lens and the reflector of the headlamp. An extension reflector, formed separate from the lamp body, is provided between the reflector and the front lens. The front end of the extension reflector is held adjacent to or in contact with the inner surface of the front lens to minimize the gap between the extension reflector and the front lens, and the rear end of the extension reflector is spaced from the reflector so that the extension reflector cannot interfere with the opening end portion of the reflector during the aiming operation of the reflector. The headlamp may be combined with other lamps in such a manner that the other lamps are arranged on both sides of the headlamp inside a single lamp body with the headlamp and other lamps juxtaposed with one another, and light shielding walls are provided for the lamps on both sides of the headlamp to cover the gaps between the reflector and the extension reflector.

16 Claims, 6 Drawing Sheets

MOTOR VEHICLE HEADLAMP

BACKGROUND OF THE INVENTION

The present invention relates to a motor vehicle headlamp of the movable reflector type, and more particularly to a motor vehicle headlamp having an improved mounting structure of an extension reflector provided between the front lens and the reflector of the headlamp.

In the case of a motor vehicle headlamp, unlike other vehicle lamps such as tail lamps and direction indicating lamps, in order to meet safety standards when assembled, adjusted or replaced, it is essential to be able to adjust the angle of inclination of the optical axis of the lamp, that is, it is necessary to adjust the angle of irradiation of the headlamp by performing a so-called aiming adjustment. For this purpose, in general, a headlamp unit including a reflector and light bulb is swingably supported within the lamp body, and the angle of inclination of the reflector is adjusted with an aiming mechanism.

In the aiming adjustment of a headlamp of the movable reflector type, in order to permit adjustment of the reflector, it is necessary to provide a space between the lamp body and the reflector and a space between the front lens and the reflector. However, these spaces can be observed through the front lens and the inner wall of the lamp body can be observed through the spaces, as a result of which the headlamp is poor in appearance. Furthermore, the spaces, which are frame-like in overall form, reduce the apparent dimensions of the inside of the headlamp.

In order to overcome these difficulties, a headlamp having an extension reflector has been proposed. The extension reflector is a cylindrical or conical member which is substantially equal in size to the front opening of the reflector and has a reflecting inner surface. The extension reflector is disposed so as to cover the above-described spaces between the reflector and the lamp body and between the reflector and the front lens.

FIG. 9 is a sectional view showing a conventional headlamp having such an extension reflector. (See European Patent No. 0 054 444). In FIG. 9, reference numeral 1 designates a vehicle body; 2, a bumper; 3, a lamp body mounted on the vehicle body 1; 4, a front lens covering the front opening of the lamp body 3; 5, a reflector arranged inside the lamp body 3 in such a manner that it can be freely inclined; 6, a light bulb; and 7, an extension reflector. The extension reflector 7 is formed integral with the lamp body 3. More specifically, the extension reflector 7 is a substantially conical member having a front opening merging with the front opening of the lamp body 3, and a rear opening substantially equal in size to the front opening of the reflector 5.

The above-described conventional headlamp is disadvantageous in that, due to the provision of the extension reflector 7, the metal mold used for forming the lamp body is necessarily bulky, and the trimming die therefor is intricate in construction. That is, the lamp body with the extension reflector is difficult to manufacture and is accordingly high in manufacturing cost.

Furthermore, there is a large gap G between the front lens 4 and the extension reflector 7. As a result, part of the output light of the light bulb 6 advances upwardly through the gap G and another part of the output light advances downwardly through the gap. These two parts of the output light, which are reflected off the bumper 2 below the gap, can dazzle the drivers of oncoming vehicles. In addition, part of the output light leaks from the side walls of the lens, making it rather difficult to provide other lamps beside the headlamp. Furthermore, the thickness t of the junction 9 of the lamp body 3 and the extension reflector 7 is large, about twice as large as the wall thickness of the lamp body 3, because the junction 9 is folded as shown in FIG. 9. Hence, when the light bulb is turned on, the junction 9 appears dark when viewed from the front. That is, the lamp is still rather poor in appearance.

SUMMARY OF THE INVENTION

Accordingly, an object of the invention is to eliminate the above-described difficulties accompanying a conventional motor vehicle headlamp. More specifically, an object of the invention is to provide a motor vehicle headlamp in which a metal mold use for forming the lamp body can be readily formed, the generation of dark regions due to the presence of the extension reflector is substantially eliminated, and in which the gap between front lens and the extension reflector is minimized so as to reduce the quantity of light leaking upward, downward and sideward through the gap.

The foregoing and other objects of the invention have been achieved by the provision of a motor vehicle headlamp in which a reflector on which a light bulb is mounted is provided inside a lamp body in such a manner that the aiming operation of the reflector can be freely achieved, in which, according to the invention, an extension reflector is provided between the reflector and a front lens, the extension reflector is formed separate from the lamp body, the front end of the extension reflector is held adjacent to or in contact with the inner surface of the front lens to minimize the gap between the extension reflector and the front lens, and the rear end of the extension reflector is spaced from the reflector so that the extension reflector cannot interfere with the opening end portion of the reflector during the aiming operation of the reflector.

The motor vehicle headlamp of the invention may be combined with other lamps in such a manner that the other lamps are arranged on both sides of the headlamp inside a single lamp body with the headlamp and other lamps juxtaposed with one another, and light shielding walls are provided for the lamps on both sides of the headlamp to cover the gaps between the reflector and the extension reflector.

In the motor vehicle headlamp of the invention, the extension reflector is manufactured separate from the lamp body, and the front end of the extension reflector is held adjacent to or in contact with the inner surface of the front lens. This structure substantially eliminates the gap between the extension reflector and the front lens, and makes it possible to eliminate the junction between the extension reflector and the lamp body.

Moreover, with the extension reflector held spaced from the reflector so that the extension reflector cannot interfere with the aiming operation of the reflector, the gaps between the extension reflector and the reflector are covered by the light shielding walls provided for the reflectors of the other lamps which are arranged both sides of the headlamp so that the light of the headlamp cannot be applied to the other lamps through the gaps.

BRIEF DESCRIPTION OF THE DRAWINGS

Preferred embodiments of the invention will be described with reference to the accompanying drawings of which.

DESCRIPTION OF THE PREFERRED EMBODIMENTS

Figure 1:
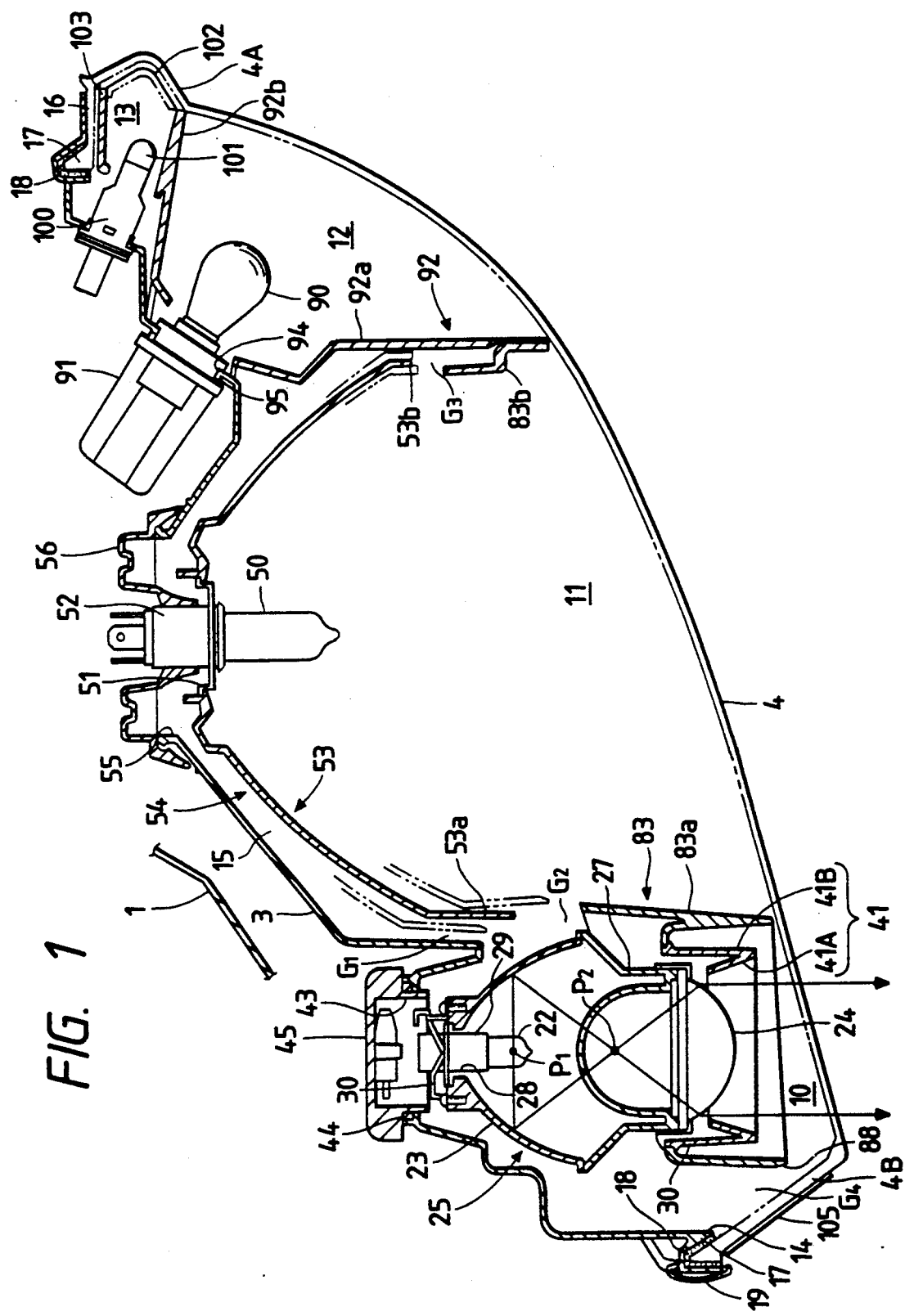
FIG. 1 a sectional view taken along line I—I in FIG. 2, showing an example of a combination lamp with a motor vehicle headlamp according to the invention.

A combination lamp, to which the technical concept of the invention is applied, as shown in FIG. 1, includes a lamp chamber 15 defined by a lamp body 3 mounted on a vehicle body 1 and by a front lens 4 which hermetically closes the front opening 14 of the lamp body 3. Four lamps are arranged inside the lamp chamber 15 in the direction of width of the vehicle, namely, a fog lamp 10, a headlamp 11, a clearance lamp 12, and a turn signal lamp 13. The combination lamp shown in FIG. 1 is installed on the left side of the vehicle body as viewed from the driver seat.

The front lens 4 is a clear lens which covers the entire front opening of the lamp body 3. The front lens 4 is substantially L-shaped in horizontal section. More specifically, the front lens 4 is formed so as to substantially follow the curvature of the front corner of the vehicle body where it is installed, and to partially extend over the side of the vehicle body. The front lens 4 has a sealing leg 16 which protrudes along the entire peripheral edge of the rear surface of the front lens 4. The sealing leg 16 is engaged by an adhesive 18 in an annular groove 17 formed in the front opening of the lamp body 3. In addition, the front lens is secured to the lamp body 3 at several points with C-shaped leaf springs 19.

Figure 4:
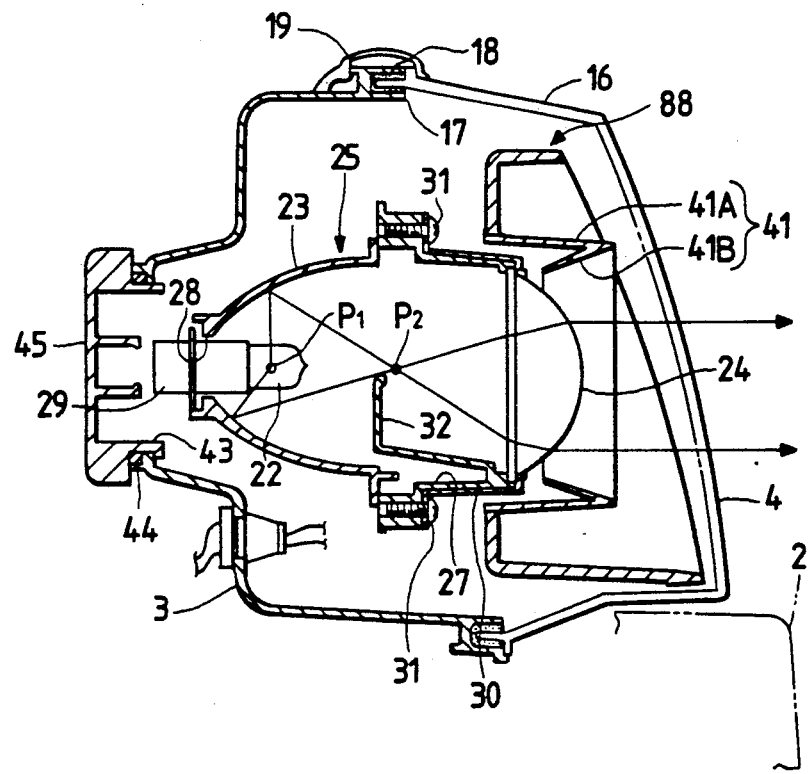
FIG. 4 is a sectional view taken along line IV—IV in FIG. 2.
Figure 5:
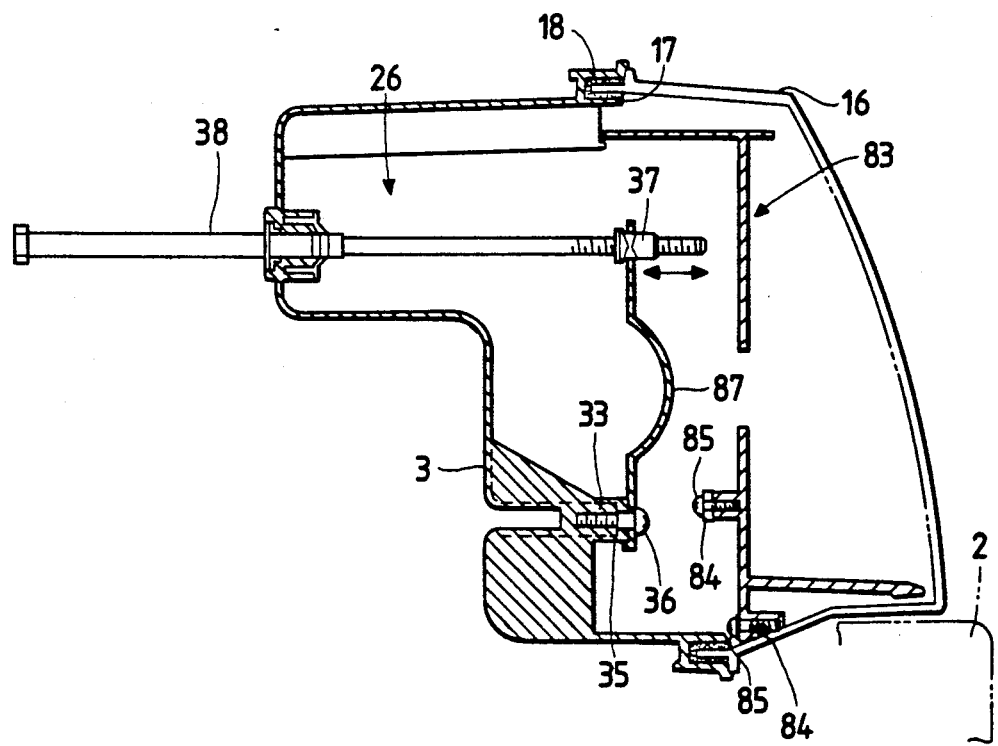
FIG. 5 is a sectional view taken along line V—V in FIG. 2.

The fog lamp 10, as shown in FIGS. 1, 4 and 5, is composed of a lamp unit 25 including a light bulb 22, an elliptical mirror 23 mounted inside the lamp body 3 at the left end (in FIG. 1), the mirror 23 having a reflecting surface substantially in the form of an ellipsoid of revolution obtained by forming an aluminum layer on its inner surface by vacuum deposition, and a condenser lens 24. An aiming mechanism 26 is provided for adjusting the angle of irradiation of the lamp unit 25 in a vertical plane. A bulb insertion hole 23 is formed in the rear end portion of the elliptical mirror 23. The bulb 22 of the fog lamp is inserted into the elliptical mirror 23 through the bulb insertion hole 23 with the aid of a light bulb base 29 having a flange. The flange of the light bulb base 29 is pushed against the edge of the bulb insertion hole 28 with a set spring, one end portion of which is mounted on the rear end portion of the elliptical mirror 23. The light bulb 22 is positioned so that its filament is at the first focal point $P_1$ of the elliptical mirror 23.

The condenser lens 24 is yellow, and its front surface is a convex surface, such as a paraboloidal surface, and its rear surface is a flat surface. The condenser lens 24 is positioned with a holder so that its focal point is substantially at the second focal point $P_2$ of the elliptical reflecting mirror 23. Hence, rays of light from the light bulb 22 which are reflected from the elliptical mirror 23 are concentrated at the second focal point $P_2$, and then gathered in a narrow space around the optical axis by the condenser lens 24. That is, the rays of light are converted into parallel rays of light, which are shone on the area in front of the vehicle.

The holder 27 is cylindrical. A metal fitting 30 (FIG. 4) is fixedly held on the outer cylindrical surface of the front end portion of the holder 27 with retaining screws 31 to thus secure the peripheral portion of the condenser lens 24 to the holder 27. A shade 32 is provided inside the holder 27 to block part of the light beam from the light bulb 22, thereby to provide the distribution of light with cut lines as required.

The aforementioned aiming mechanism 26, as shown in FIG. 5, includes a pair of right and left retaining screws 36 adapted to secure an elastically deformable holder 87 provided at the rear end portion of the elliptical mirror 23 through a spacer 35 to a reflecting mirror mounting portion 33 of the lamp body 3, a self-locking nut 37 provided on the upper end portion of a support member 34, and an adjusting screw 38 penetrating the rear wall of the lamp body 3 in such a manner that it can rotate only with its end portion engaged with the self-locking nut 37. By turning the adjusting screw 38, the self-locking nut 37 is moved along the adjusting screw 38 so that the support member 34 is inclined in a vertical plane, and accordingly the elliptical mirror 23, being integral with the support member, is inclined in the same direction, thereby to adjust the angle of irradiation of the fog lamp 10.

A protector 41 (FIGS. 1 and 4) is provided in front of the holder 27. The protector 41 covers the space between the condenser lens 24 and the lamp body 3 and the space between the lamp body and the reflector 53 of the headlamp 11 (described later), and protects the components surrounding the condenser lens 24 from the heat generated by the latter. The protector 41 is composed of a cylindrical portion 41A and a conical portion 41B which are formed, as one unit, with aluminum or synthetic resin in such a manner that the conical portion 41B is located inside the cylindrical portion 41A with the front end of the former merging with the front end of the latter. An aluminum layer is formed on the inner wall of the protector 41 by vacuum deposition to form a reflecting surface. The diameter of the rear end opening of the conical portion 41B is slightly larger than the outside diameter of the condenser lens 24.

A bulb insertion hole 43 is formed in the rear wall of the lamp body 3 at a point corresponding to the position of the fog lamp 10. The bulb insertion hole 43 thus formed is hermetically closed with a back cover 45 which is fitted therein through an O-ring 44.

The headlamp 11, as shown in FIGS. 1, 2 and 6 through 8, includes a lamp unit 54 composed of a light bulb 50 and a reflector 53 having a bulb insertion hole 51 in its rear end portion, a socket cover 56 made of an elastic material such as rubber, and an aiming mechanism for the reflector 53. The light bulb 50 is inserted into the reflector 53 through the light bulb insertion hole 51 with the aid of a light bulb base 52. The socket cover 56 has a central hole which is hermetically engaged with the rear end portion of the light bulb base 52, and a peripheral portion which hermetically closes the bulb insertion hole 55 formed in the lamp body 3.

The light bulb 50 for the headlamp is a halogen lamp which has a first filament (not shown) for forming a low beam and a second filament (not shown) for forming a high beam.

The light bulb base 52 is fitted in the bulb insertion hole 51 formed in the reflector 53 and is fixedly secured thereto with a set spring 60, one end portion of which is mounted on the rear end portion of the reflector 53.

The reflector 53 has a front opening which is substantially rectangular, and a rear wall whose inner surface is in the form of a paraboloid of revolution. The inner surface is formed into a reflecting surface by an aluminum layer formed thereon by vacuum deposition. The aiming mechanism 57 is adapted to swing the reflector 53 horizontally and vertically, thereby to adjust the inclination of the optical axis, i.e., the angle of irradiation.

The aiming mechanism 57 includes one swing fulcrum mechanism 62 (FIG. 8) and two inclining mechanisms 63 (FIG. 7) and 64 (FIG. 8) which support the reflector 53 at three points.

Figure 8:
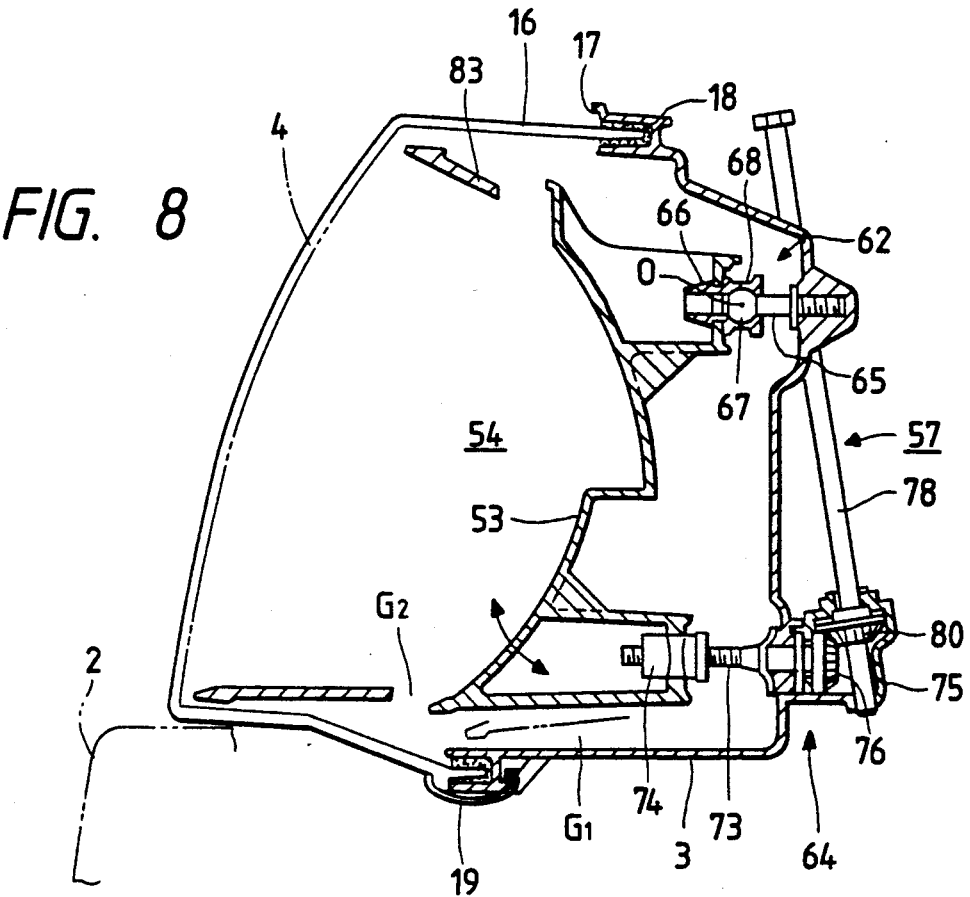
FIG. 8 is a sectional view taken along line VIII—VIII in FIG. 2.
Figure 9:
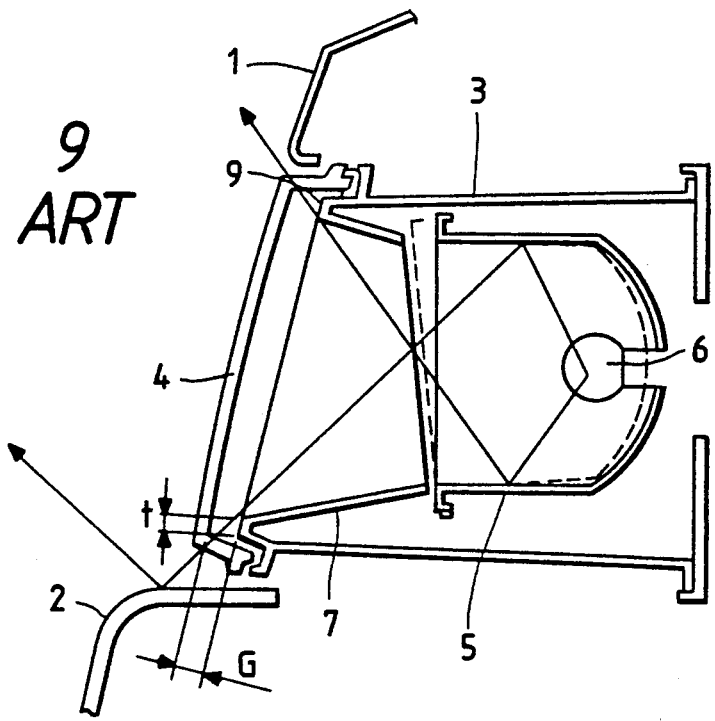
FIG. 9 is a sectional view showing the mounting structure of an extension reflector in a conventional headlamp.

The swing fulcrum mechanism 62, as shown in FIG. 8, includes a swing fulcrum shaft 65 embedded in the upper right-hand end portion of the rear wall of the lamp body 10, and a bag-shaped bearing 66 fitted in the upper portion of the rear wall of the reflector 53. The end portion of the swing fulcrum shaft 65 is formed into a spherical head 67, which is slidably engaged with the spherical seat 68 of the bag-shaped bearing 66. The center O of the spherical head 72 is the center of swing of the reflector 53. The swing fulcrum shaft 70 is provided at a position predetermined distances from a horizontal axis (or optical axis horizontal line) X and a vertical axis (or optical axis vertical line) Y which pass through the center $O_1$ (FIG. 2) of the light bulb 50 when measured upward toward the right.

Figure 7:
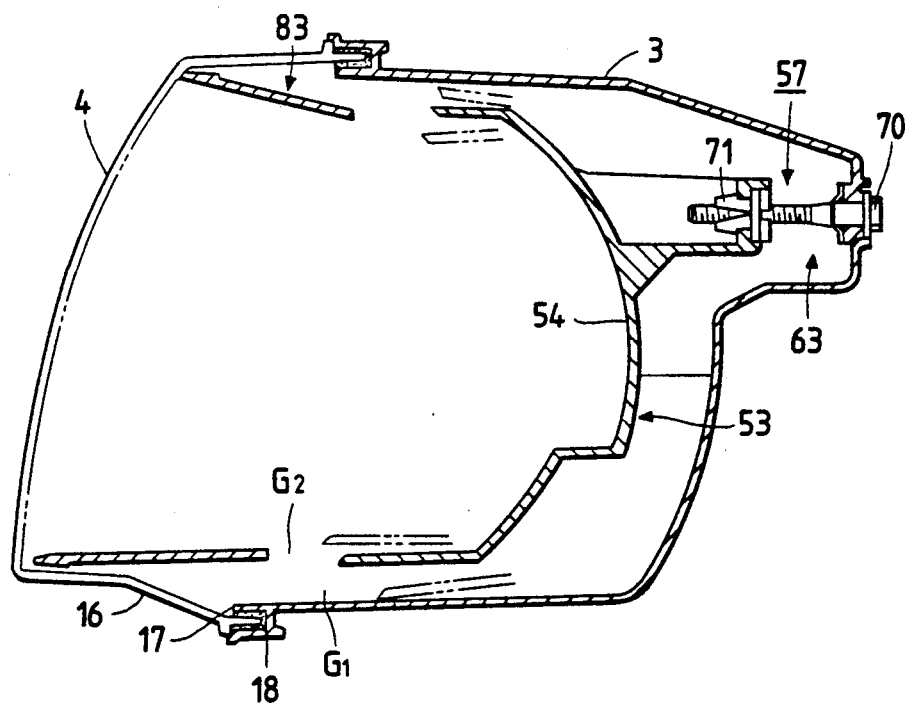
FIG. 7 is a sectional view taken along line VII—VII in FIG. 2.

The inclining mechanism 63 is provided on the side which is opposite to the side where the swing fulcrum mechanism 62 is provided. More specifically, the inclining mechanism 63 is positioned so that it is substantially symmetrical in position with the swing fulcrum shaft 62 with respect to the vertical axis Y intersecting the center $O_1$ of the light bulb 50. Hence, with the inclining mechanism 63, the reflector 53 can be swung horizontally; that is, the angle of irradiation in a horizontal plane can be adjusted. Thus, the inclining mechanism 63 may be employed for horizontal adjustment. The inclining mechanism 63, as shown in FIG. 7, includes an aiming screw 70 which is threadedly engaged with the upper portion of the rear wall of the lamp body 3, and a self-locking nut 71 with which the front end portion of the aiming screw 70 is threadedly engaged.

Figure 2:
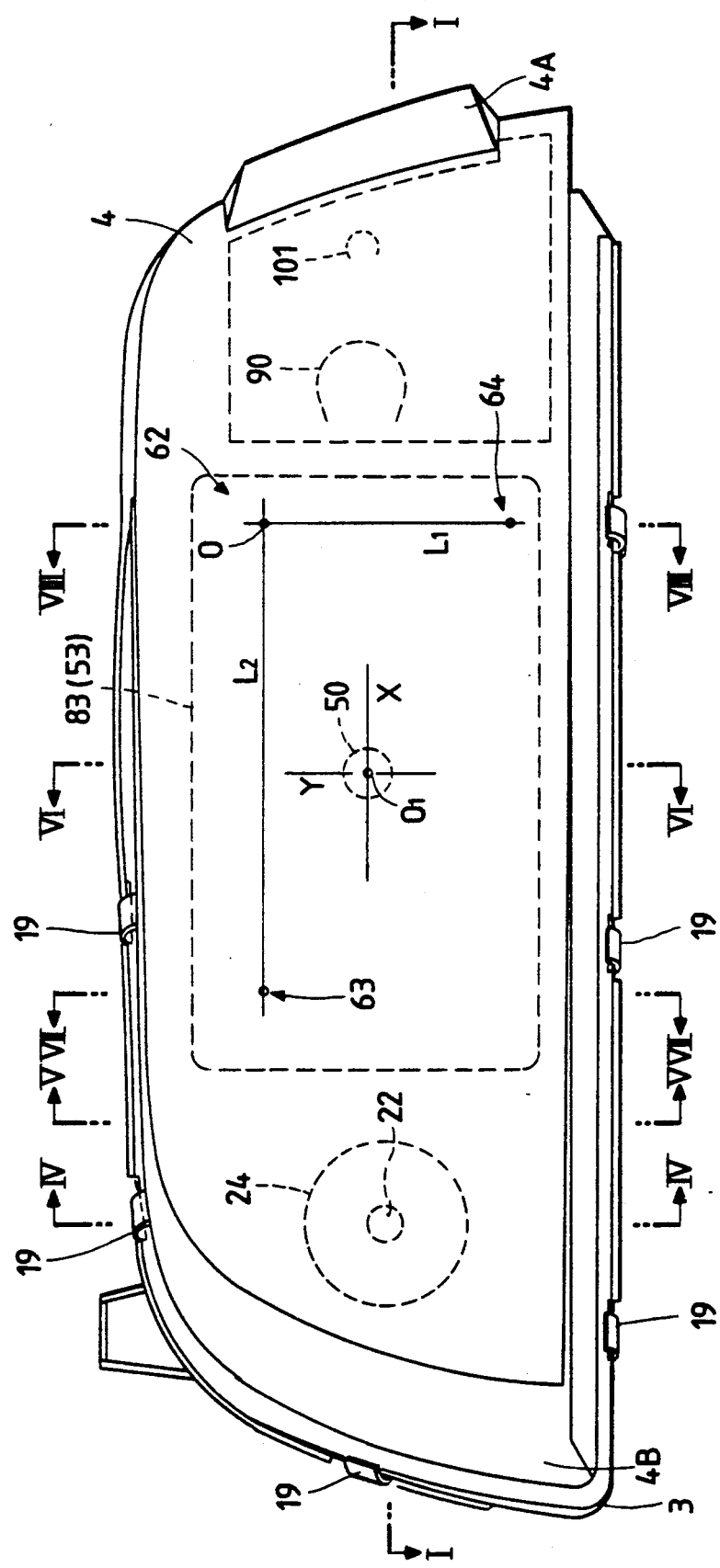
FIGS. 2 and 3 are, respectively, a front view and a plan view of the combination lamp.
Figure 3:
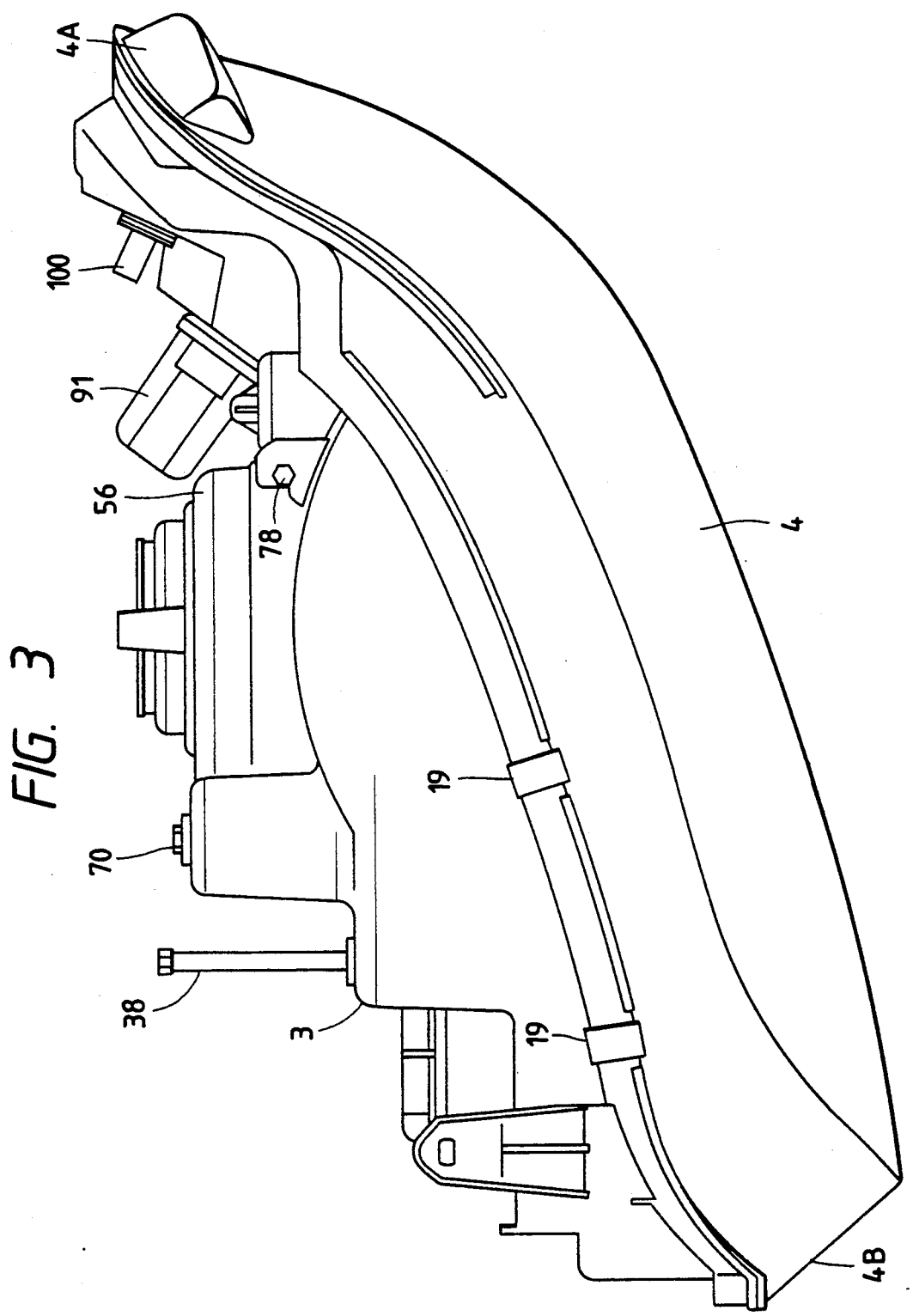

The other inclining mechanism 64, which is used for vertical adjustment, is located below the swing fulcrum mechanism 62. More specifically, the inclining mechanism 64 is symmetrical in position with the swing fulcrum mechanism 62 with respect to the horizontal axis X (FIG. 2). Hence, with the inclining mechanism 64, the reflector 53 can be swung vertically; that is, the angle of irradiation in a vertical plane can be adjusted.

The inclining mechanism 64, as shown in FIG. 8, includes an aiming screw 73 held substantially horizontal and extending in a front-to-rear direction, and which is threadedly engaged with the lamp body 3, being limited in axial movement. The front end portion of the aiming screw 73 is threadedly engaged with a self-locking nut 74 which is mounted on the lower portion of the rear wall of the reflector 53. The rear end portion of the aiming screw 73 is inserted into a gear box 74 mounted on the rear wall of the lamp body 3, and it is connected to a bevel gear 76. The gear box has a rod 78 which extends substantially perpendicular to the aiming screw 73, and a bevel gear 80 which is connected to the lower end of the rod 78 and engaged with the aforementioned bevel gear 76. The upper end portion of the rod 78 extends upward along the lamp body 3.

When the aiming screw 70 of the inclining mechanism 63 is turned with a suitable tool from above the lamp body 3, the self-locking nut 77 is moved along the aiming screw 70 since the latter is allowed only to rotate. As a result, the reflector 53 is horizontally swung about the line $L_1$ (FIG. 2) connecting the above-described swing center O (FIG. 2) and the other inclining mechanism 64, as indicated by the two-dot chain lines in FIG. 1; that is, the angle of irradiation in a horizontal plane is adjusted.

Also, the rod 78 of the inclining mechanism 64 can be turned with a suitable tool from above. The rotation of the rod 78 is transmitted through the bevel gears 80 and 76 to the aiming screw 73 to rotate the latter. As a result, the self-locking nut 74 is moved along the aiming screw 73 since the aiming screw 73 is allowed only to rotate, whereby the reflector 53 is swung vertically about the line $L_2$ (FIG. 2) connecting the above-described center O (FIG. 2) and the inclining mechanism 63, as indicated by the two-dot chain line in FIGS. 6 and 8; that is, the angle of irradiation in a vertical plane is adjusted. For this aiming adjustment, a gap $G_1$ is provided between the inner surface of the lamp body 3 and the reflector 53.

The above-described aiming mechanism 57 is known in the art.

In the above-described headlamp 11, an extension reflector 83 (FIGS. 1, 2, and 4 through 8) is provided in front of the reflector 53. The extension reflector, which is separate from the reflector 53, covers the gap $G_1$ between the lamp body 3 and the reflector 53 and the gaps between the front lens 4 and the sides of the reflector 53. The extension reflector 83 is made of aluminum or synthetic resin. The extension reflector 83 is in the form of a cylinder whose section is substantially equal in configuration to the front opening of the reflector 53. The inner surface of the extension reflector 83 is a reflecting surface. The upper and lower end portions of the extension reflector are fixedly secured to a plurality of fixing portions 84 formed inside the lamp body 3 with retaining screws 85.

The front edge portion of the extension reflector 83, which is tapered outwardly, is set adjacent the inner surface of the front lens 4 (or set in contact with the front lens 4) as shown in FIG. 1, so that no gap is formed between the front lens 4 and the extension reflector 83. On the other hand, the rear edge portion of the extension reflector 83 is confronted with the front opening of the reflector 53 with gaps $G_2$ and $G_3$ necessary for allowing adjustment of the reflector 53 (FIG. 1) being provided.

An auxiliary extension reflector 88 is formed integral with the outer surface of the left-hand wall 83a (on the left-hand side in FIG. 1) of the extension reflector 83 in such a manner that it surrounds the protector 41 and, together with the protector 41, forms a protector for the fog lamp 10. The rear end of the auxiliary extension protector 88 is joined to the rear end opening of the cylindrical portion 41A of the protector 41.

The elliptical mirror 23 of the fog lamp 10 serves as a light-shielding member which covers the gap $G_2$ (FIG. 1) between the front end portion of the left-hand wall 53a of the reflector 53 of the headlamp 11 and the rear end portion of the left-hand wall 83a of the extension reflector 83, thereby to eliminate the difficulty of the light of the light bulb in the elliptical mirror 23 being observable through the front lens 4 obliquely from the front of the vehicle.

The clearance lamp 12, as shown in FIG. 1, includes a light bulb 90, a socket 91 for holding the light bulb 90, and a reflector 92 arranged fixedly inside the lamp body 3. The socket 91 is engaged through an O-ring 95 with a bulb mounting hole 94 formed in the rear wall of the lamp body 3. The inner surface of the reflector 92 is formed into a reflecting surface by forming an aluminum layer thereon by vacuum deposition. The left-hand wall 92a (on the left hand side in FIG. 1) of the reflector 92 extends forwardly and is joined to the front edge of the right-hand wall 83b of the above-described extension reflector 83 so that it serves as a light shielding wall to close the gap $G_3$ between the front end portion of the right-hand wall 53b of the reflector 53 of the headlamp 11 and the rear end portion of the right-hand wall 83b of the extension reflector 83. This eliminates the difficulty of the inside of the headlamp 11 or the clearance lamp 12 being observable through the front lens 4 obliquely from the front of the vehicle, and prevents the output light beams of the light bulbs 50 and 90 from passing through the gap $G_3$.

The turn signal lamp 13 includes a light bulb 101 with a socket 100 mounted on the right-hand end portion of the lamp body 3, an inner lens 102 colored as required, and a reflector 103. The reflector 103 is integral with the front end portion of the right-hand wall 92b of the reflector 92 in the clearance lamp 12. The outer surface of the right-hand wall 92b of the reflector 92 forms a part of the reflector of the turn signal lamp 13. The inner lens 102 is a convex lens which curves forwardly. In correspondence to this curved configuration of the inner lens, the right end portion 4A of the front lens 4 is curved forwardly. The right end portion 4A thus protrudes sidewardly of the vehicle body so that, when the vehicle is turning or changing lanes, the turn signal lamp can positively be seen by other drivers.

As shown in FIG. 1, a light shielding film 105 is formed on the left-hand side wall 4B of the front lens 4 to eliminate the difficulty of the lamp unit 25 of the fog lamp 10 being observable through the gap $G_4$ between the left-hand wall of the lamp body 3 and the auxiliary extension reflector 88.

Figure 6:
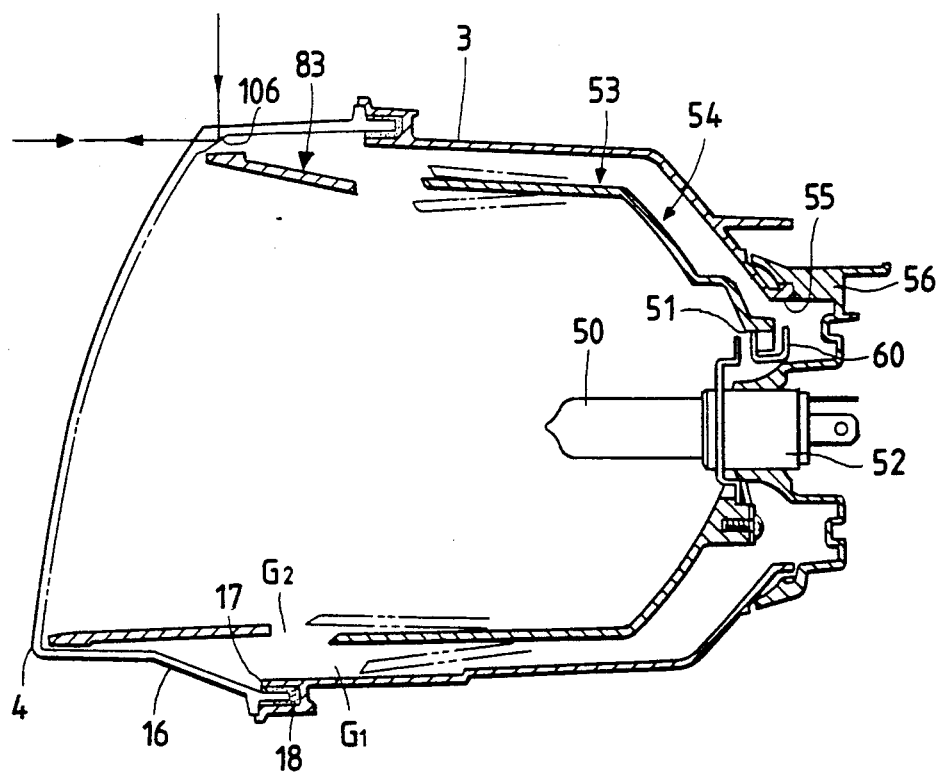
FIG. 6 is a sectional view taken along line VI—VI in FIG. 2.

As shown in FIG. 6, the inner surface of the junction of the front wall and the top wall of the front lens 4 is formed as a reflecting surface 106 to reflect the light which comes from above or from the forward direction. When light coming from above is reflected by the reflecting surface 106, the latter appears bright. Therefore, the top wall of the front lens 4 is observed bright from the front of the vehicle. If the top wall of the front lens is colored, then the periphery of the front lens appears in that color.

In the motor vehicle headlamp thus constructed, the extension reflector 83 is separated from the lamp body 3, and therefore the metal mold for the lamp body 3 is relatively small in size. Furthermore, the lamp body is simple in configuration, and therefore it can be formed at low manufacturing cost. The front edge portion of the extension reflector 83 extends so that it is adjacent to or in contact with the inner surface of the front lens 4. This construction blocks the light advancing obliquely upwardly through the space between the top wall of the front lens 4 and the front end of the upper wall of the extension reflector 83, or the light advancing sidewardly to enter the adjacent fog lamp 10 and the clearance lamp 12, or the light advancing obliquely downwardly through the space between the bottom wall of the front lens 4 and the front end of the lower wall of the extension reflector 83 so as to be reflected from the bumper 2. Hence, with the invention, the difficulties of such light dazzling the driver of an oncoming vehicle or such light adversely affecting the adjacent lamps are eliminated. Furthermore, since the front edge portion of the extension reflector 83 is tapered forwardly, the difficulty is also eliminated of the front edge portion forming a dark region in the headlamp. Thus, the combination lamp is improved in external appearance.

The invention has been described with reference to the headlamp 11 constructed as a combination lamp; however, it should be noted that the invention is not limited thereto or thereby. Specifically, the technical concept of the invention is equally applicable to a headlamp which is not combined with other lamps.

As described above, in the motor vehicle headlamp of the invention, the extension reflector is produced separate from the reflector, the aiming operation of which can be freely achieved, and it is disposed between the reflector and the front lens, with its front edge portion held adjacent to or in contact with the inner surface of the front lens. Therefore, the metal mold for the lamp body can be small in size and simple in construction. In addition, the light beams can be effectively blocked which advance obliquely upwardly, obliquely downwardly and sidewardly through the gaps between the front lens and the extension reflector.

In the combination lamp including the common lamp body, the headlamp, and the other lamps arranged on both sides of the headlamp, the light shielding walls are provided for the other lamps to cover the gaps formed between the extension reflector and the reflector to allow the aiming operation of the latter. Therefore, the light of the headlamp will not enter the other lamps through the gaps.

What is claimed is:

1. A motor vehicle lamp comprising:
   a headlamp comprising a lamp body and a main headlamp reflector and a light bulb mounted in said reflector, an aiming mechanism for mounting said main reflector within said lamp body in such a manner that an aiming operation of said main reflector can be freely achieved;
   a front lens covering a front opening in said lamp body forward of said main reflector; and
   an extension reflector provided between said reflector and said front lens, an inner surface of said extension reflector being reflective and acting as an extension of a reflecting surface of said main reflector, said extension reflector being formed separate from said lamp body, a front end of said extension reflector being adjacent to or in contact with an inner surface of said front lens to minimize a gap between said extension reflector and said front lens, and a rear end of said extension reflector being spaced from said main reflector so that said extension reflector cannot interfere with an opening end portion of said reflector during the aiming operation of said main reflector.

2. The motor vehicle lamp as claimed in claim 1, further comprising a plurality of other lamps mounted within said lamp body, said other lamps being arranged on both sides of said headlamp inside said lamp body, said headlamp and said other lamps being juxtaposed with one another.

3. The motor vehicle lamp of claim 2, further comprising light shielding walls provided for said lamps on both sides of said headlamp to cover gaps between said main reflector and said extension reflector.

4. The motor vehicle lamp as claimed in claim 1, wherein said extension reflector is substantially in the form of a cylinder whose section is substantially equal in configuration to a front opening of said main reflector.

5. The motor vehicle lamp as claimed in claim 4, wherein said extension reflector is made of aluminum.

6. The motor vehicle lamp as claimed in claim 4, wherein said extension reflector is made of a synthetic resin with a reflecting coating formed on an inner surface thereof.

7. The motor vehicle lamp as claimed in claim 2, wherein a first of said other lamps comprises a projection-type fog lamp comprising an elliptical mirror, a light bulb positioned at a first focal point of said elliptical mirror, a condenser lens positioned at a second focal point of said elliptical mirror, and a lens holder mounting said condenser lens on a front end portion of said elliptical mirror, and further comprising a protector covering a space between said condenser lens and said lamp body and a space between said lamp body and said main reflector.

8. The motor vehicle lamp of claim 7, wherein said protector comprises a cylindrical portion and a conical portion which are formed as one unit with said conical portion located inside said cylindrical portion and with a front end of said conical portion merging with a front end of said cylindrical portion, the diameter of a rear end opening of said conical portion being slightly larger than the outside diameter of said condenser lens.

9. The motor vehicle lamp of claim 8, further comprising an auxiliary extension reflector formed integrally with an outer surface of one side wall of said extension reflector, said auxiliary extension reflector surrounding said protector, a rear end of said auxiliary extension reflector being joined to a rear end opening of said cylindrical portion of said protector.

10. The motor vehicle lamp of claim 7, wherein a second of said other lamps comprises a clearance lamp mounted on the opposite side of said main reflector of said headlamp from said fog lamp, said clearance lamp comprising a light bulb, a socket for holding said light bulb, and a reflector arranged inside said lamp body, said socket being mounted to said lamp body through a rear opening in said reflector of said clearance lamp.

11. The motor vehicle lamp of claim 10, wherein a side wall of said reflector of said clearance lamp extends forwardly and is joined to a front edge of a side wall of said extension reflector.

12. The motor vehicle lamp of claim 10, wherein a third of said other lamps comprises a turn signal lamp provided inside said lamp body on a side of said clearance lamp opposite from said main reflector, said turn signal lamp comprising a light bulb and a reflector, said reflector of said clearance lamp forming a part of said reflector of said turn signal lamp.

13. The motor vehicle lamp of claim 1, wherein an inner surface of a junction of a front wall and a top wall of said front lens is a reflecting surface.

14. The motor vehicle lamp of claim 1, wherein an inner surface of a junction of a front wall and a top wall of said front lens is colored, while other parts of said front lens are clear.

15. The motor vehicle lamp of claim 7, further comprising a light shielding film formed on a side wall of said front lens adjacent said fog lamp.

16. The motor vehicle lamp of claim 1, wherein said extension reflector is a plate-like member.

* * * * *